United States Patent
Kato et al.

(10) Patent No.: US 11,660,679 B2
(45) Date of Patent: May 30, 2023

(54) TOOL BODY

(71) Applicant: TUNGALOY CORPORATION, Fukushima (JP)

(72) Inventors: Tatsumi Kato, Iwaki (JP); Ryuichi Saji, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/574,142

(22) Filed: Jan. 12, 2022

(65) Prior Publication Data

US 2022/0219245 A1  Jul. 14, 2022

(30) Foreign Application Priority Data

Jan. 13, 2021 (JP) .............................. JP2021-003700

(51) Int. Cl.
B23B 27/16 (2006.01)

(52) U.S. Cl.
CPC ...... B23B 27/1677 (2013.01); *B23B 27/1622* (2013.01); *B23B 2200/048* (2013.01); *B23B 2205/04* (2013.01)

(58) Field of Classification Search
CPC ............ B23B 27/1677; B23B 2205/04; B23B 27/1611; B23B 27/1614; B23B 27/1603; B23B 2205/12; B23B 27/1622; B23B 2205/045; B23B 2200/048
See application file for complete search history.

(56) References Cited

U.S. PATENT DOCUMENTS

| | | | | |
|---|---|---|---|---|
| 3,314,126 A | * | 4/1967 | Stier ................... | B23B 27/1622 407/105 |
| 3,908,255 A | * | 9/1975 | Faber .................. | B23B 27/1651 407/105 |
| RE31,292 E | * | 6/1983 | Erickson ............. | B23B 27/1662 407/105 |
| 6,526,814 B1 | * | 3/2003 | Kataoka ................... | G01N 3/58 73/104 |

(Continued)

FOREIGN PATENT DOCUMENTS

| | | | |
|---|---|---|---|
| GB | 1402702 A | 8/1975 | |
| JP | 09234608 A | * 9/1997 | ......... B23B 27/1677 |

(Continued)

*Primary Examiner* — Sara Addisu
(74) *Attorney, Agent, or Firm* — Studebaker & Brackett PC

(57) ABSTRACT

A tool body to which a replaceable cutting insert is fixed includes: a holder; an insert mounting seat that is provided on a first surface of the holder; a clamp member that constrains the cutting insert placed on the insert mounting seat; and an operating member that presses a pressure receiving surface of the clamp member. The clamp member has the pressure receiving surface, a spherical head portion that is formed into a spherical crown shape, and a hook portion that protrudes to a side opposite to a side of the spherical head portion when seen from a side of the first surface. The insert mounting seat supports the clamp member to be swingable with the spherical head portion as a fulcrum, and the hook portion contacts a diameter reducing portion that is formed on an inner peripheral surface of an mounting hole for the cutting insert in a state in which the pressure receiving surface is pressed.

6 Claims, 8 Drawing Sheets

(56) References Cited

U.S. PATENT DOCUMENTS

| | | | | |
|---|---|---|---|---|
| 7,347,650 B2* | 3/2008 | Tipu | ................... | B23B 27/1662 |
| | | | | 407/66 |
| 9,174,279 B2* | 11/2015 | Hecht | ................. | B23B 27/1614 |
| 10,682,709 B2* | 6/2020 | Larsson | .............. | B23B 27/1677 |
| 2011/0274507 A1* | 11/2011 | Park | ................... | B23B 27/1662 |
| | | | | 407/107 |
| 2012/0082522 A1* | 4/2012 | Hecht | ................. | B23B 27/1677 |
| | | | | 407/105 |
| 2016/0288216 A1* | 10/2016 | Joo | ................... | B23B 27/1662 |
| 2021/0031281 A1* | 2/2021 | Raboach | ................... | B23C 5/22 |
| 2022/0219243 A1* | 7/2022 | Kato | ................... | B23B 27/145 |

FOREIGN PATENT DOCUMENTS

| | | | |
|---|---|---|---|
| JP | H09-290305 A | 11/1997 | |
| JP | 2877140 B2 | 3/1999 | |
| JP | 2012-514543 A | 6/2012 | |
| JP | 2013-538702 A | 10/2013 | |
| SU | 1007842 A * | 3/1983 | ......... B23B 27/1677 |

* cited by examiner

TOOL BODY

CROSS-REFERENCES TO RELATED APPLICATIONS

This application relates to and claims priority from Japanese Patent Application No. 2021-003700, filed on Jan. 13, 2021, the entire disclosure of which is incorporated herein by reference.

BACKGROUND

Field

The present invention relates to a tool body to which a replaceable cutting insert is fixed.

Description of Related Art

A turning tool includes a replaceable cutting insert and a tool body to which the cutting insert is fixed. The cutting insert is fixed to the insert mounting seat of a tool body by a cramp screw or the like inserted from one end surface to the other end surface. In a state in which the turning tool is attached to a tool rest such as a turret, a worker sometimes has a difficulty in extracting the cramp screw in a direction facing the insert mounting seat. Therefore, there has been proposed a tool body that allows the operation of a cramp member in a direction different from a direction in which an insert mounting seat is provided.

For example, Japanese Translation of PCT Application No. 2012-514543 discloses a cutting insert fixation device in which fastening or loosening of an L-shaped clamp lever is allowed by the rotation of a fixation screw arranged on a surface different from a surface on which an insert pocket is provided. The axial line of the fixation screw obliquely crosses the insert pocket. When the fixation screw is fastened, the distal end of the fixation screw presses an inclined surface provided on the clamp lever and the clamp lever turns with the lower end of a supporting portion formed into a cylindrical surface as a fulcrum.

SUMMARY

However, in the cutting insert fixation device described in Japanese Translation of PCT Application No. 2012-514543, a direction in which the fixation screw is allowed to press the clamp lever is limited to the axial line direction of the fixation screw. In Japanese Translation of PCT Application No. 2012-514543, an inclined surface inclined with respect to the bottom surface of the clamp lever serves as a pressure receiving surface perpendicular to the axial line direction of the fixation screw. Thus, it is possible to transmit, even if a direction in which the fixation screw presses the clamp lever is deviated from a direction in which the clamp lever turns, the pressing force of the fixation screw to the clamp lever so long as the deviation is only a certain degree of deviation. However, in such a configuration, it is not possible to arrange the fixation screw so as to be greatly deviated with respect to the direction in which the clamp lever turns.

In a case in which a turning tool is attached to a turret, the position most easily operated by a worker could be the distal end surface of the turning tool. In a configuration as disclosed in Japanese Translation of PCT Application No. 2012-514543, it is difficult to arrange an operating member on the distal end surface of a turning tool since limitation on the arrangement of a fixation screw is large. In addition, in a configuration as disclosed in Japanese Translation of PCT Application No. 2012-514543, the lower end of the column surface of a supporting portion that supports a load from a fixation screw is rounded and the position of a fulcrum becomes unstable as a clamp lever repeatedly swings. The accuracy of a position at which the clamp lever contacts a cutting insert is susceptible to uneven abrasion.

The present invention has been made in view of the above circumstances and has an object of providing a tool body that facilitates the replacement of a cutting insert.

An aspect of the present invention provides a tool body to which a replaceable cutting insert is fixed, the tool body including: a holder: an insert mounting seat that is provided on a first surface of the holder; a clamp member that constrains the cutting insert placed on the insert mounting seat; and an operating member that presses a pressure receiving surface of the clamp member. The clamp member has the pressure receiving surface, a spherical head portion that is formed into a spherical crown shape, and a hook portion that protrudes to a side opposite to a side of the spherical head portion when seen from a side of the first surface. The insert mounting seat supports the clamp member to be swingable with the spherical head portion as a fulcrum, and the hook portion contacts a diameter reducing portion that is formed on an inner peripheral surface of an mounting hole for the cutting insert in a state in which the pressure receiving surface is pressed.

According to the aspect, the clamp member is capable of freely swinging vertically and horizontally with the spherical-crown-shaped spherical head portion as a fulcrum. Therefore, it is possible to press the cutting insert with the hook portion in a deviated positional relationship in which the clamp member is not on the same plane as the input direction of the operating member. It is possible to arrange the operating member at an optimum position at which the replacement of the cutting insert is facilitated. Since the spherical head portion serving as a fulcrum is originally a spherical surface, influence on the positional accuracy between the clamp member and the insert mounting seat is small even if the spherical head portion is rounded due to its abrasion.

In the aspect, the operating member may have a screw portion on which a male screw threadedly engaged with the holder is formed and a pressing surface that presses the pressure receiving surface in a direction crossing an axial line of the screw portion.

According to the aspect, it is possible to make a direction in which the operating member moves different from a direction in which the pressing surface of the operating member presses the pressure receiving surface of the clamp member when the screw portion of the operating member is fastened. By a synergistic effect with the spherical-crown-shaped spherical head portion having a large degree of freedom in movement, it is possible to achieve not only a positional relationship in which the axial line direction of the screw portion of the operating member is deviated from the turning direction of the clamp member but also a further increase in the deviating amounts of the directions compared with a configuration in which the spherical head portion is not provided. As a result, it is possible to reduce limitation on the arrangement of the operating member.

In the aspect, the pressure receiving surface may be constituted by a part of a recessed cylindrical surface, and the pressing surface may be constituted by a track formed by rotating a protruding arc serving as a generating line about the axial line of the screw portion on an outer peripheral side of the screw portion.

According to the aspect, the position of a force point is easily arranged in a narrow region as designed since the contact area between the pressing surface and the pressure receiving surface is small. As a result, it is possible to more reliably constrain the cutting insert.

In the aspect, the holder may have a distal end surface that faces a side opposite to a side on which the tool body is fixed to a working machine, and at least a part of the operating member may be exposed to a side of the distal end surface.

According to the aspect, it is possible to arrange the operating member on the distal end surface since limitation on the arrangement of the operating member is small. Since a worker is allowed to perform an operation on the side of the distal end surface of the tool body, the replacement of the cutting insert is facilitated in a case in which a turning tool is attached to a tool rest such as a turret.

In the aspect, the hook portion may have a central portion and first and second end portions that are positioned on sides opposite to each other with the central portion held therebetween, and the first and second end portions may contact the cutting insert while the central portion does not contact the cutting insert.

The shape of the distal end of the hook portion or the shape of the mounting hole for the cutting insert has a slight fluctuation allowed as tolerance. According to the aspect, the hook portion reliably contacts the inner peripheral surface of the diameter reducing portion at two points even if the shape of the hook portion or the shape of the attachment surface has a slight fluctuation. Therefore, the constraint of the cutting insert by the clamp member becomes stable.

According to the present invention, it is possible to provide a tool body that facilitates the replacement of a cutting insert.

DETAILED DESCRIPTION

Figure 1:
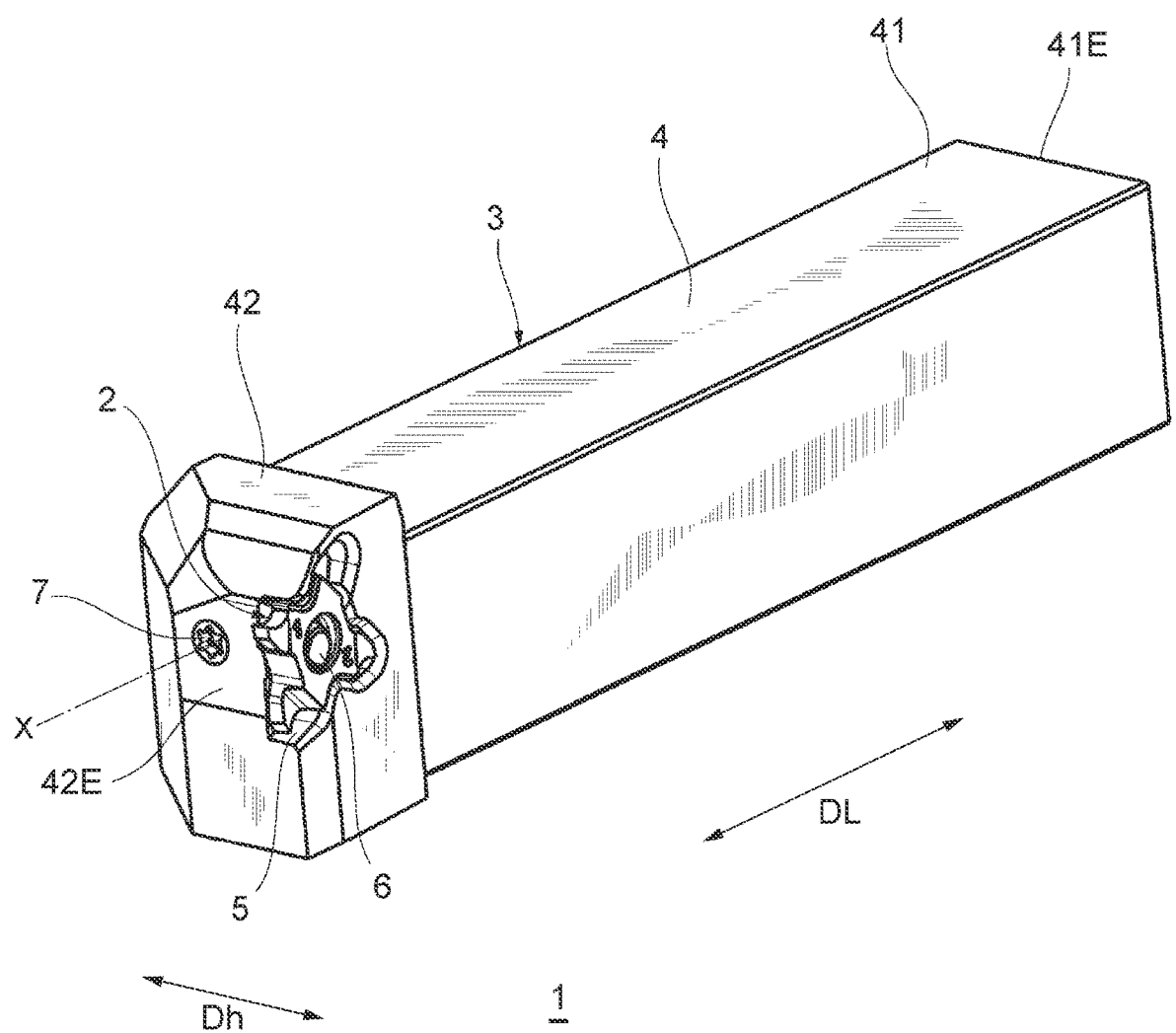
FIG. 1 is a perspective view showing an example of a turning tool according to an embodiment of the present invention.

A preferred embodiment of the present invention will be described with reference to the accompanying drawings. Note that parts denoted by the same symbols have the same or similar configurations in respective figures. Hereinafter, respective configurations will be described in detail with reference to the drawings. FIG. 1 is a perspective view showing an example of a turning tool 1 according to an embodiment of the present invention. As shown in FIG. 1, the turning tool 1 includes a replaceable cutting insert 2 and a tool body 3 to which the cutting insert 2 is fixed. In an example shown in FIG. 1, the turning tool 1 is configured as a grooving tool fixed to the tool rest of a lathe.

The tool body 3 includes a holder 4 and a clamp member 6 and an operating member 7 that are attached to the holder 4. The holder 4 is formed into a rod shape extending from a proximal end 41E to a distal end 42E on the side opposite to the side of the proximal end 41E. At a distal end 42 of the holder 4 that includes the distal end 42E and its adjacent parts, an insert mounting seat 5 on which the cutting insert 2 is to be placed is provided. The side of the holder 4 that is closer to the proximal end 41E than the distal end 42 is configured as a shank fixable to a working machine.

Figure 2:
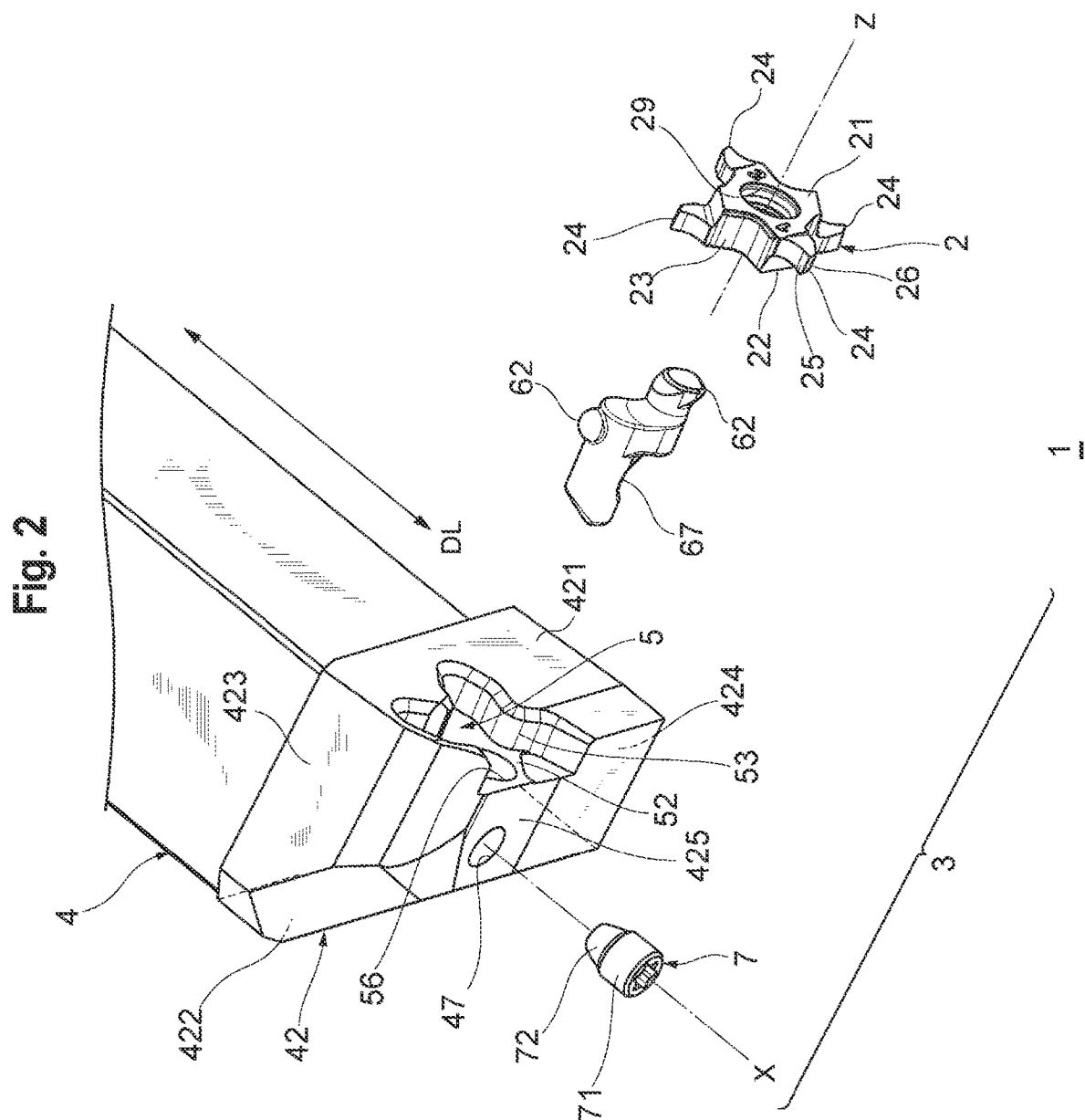
FIG. 2 is an exploded perspective view of the turning tool shown in FIG. 1.

FIG. 2 is an exploded perspective view of the turning tool 1 shown in FIG. 1. As shown in FIG. 2, the insert mounting seat 5 has a seating surface 52 that contacts the bottom surface (for example, a second end surface 22) of the cutting insert 2 that will be described later to constrain the cutting insert 2 and a wall surface 53 that contacts a peripheral lateral surface 23 of the cutting insert 2 that will be described later to constrain the cutting insert 2.

The distal end 42 has a distal end surface 425 and first to fourth surfaces 421, 422, 423, and 424 facing the distal end surface 425. The distal end 42E of the holder 4 is positioned on the distal end surface 425. The insert mounting seat 5 is provided on the first surface 421. The second surface 422 is positioned on the side opposite to the side of the first surface 421. The third and fourth surfaces 423 and 424 connect the first and second surfaces 421 and 422 to each other.

In the following description, a direction from the first surface 421 to the second surface 422 and a direction from the second surface 422 to the first surface 421 in a height direction Dh of the holder 4 are called a downward direction and an upward direction, respectively, in some cases. The height direction (vertical direction) Dh of the holder 4 is a direction in which the first surface 421 and the second surface 422 of the distal end 42 are connected to each other and may not be necessarily orthogonal to a longitudinal direction DL of the holder 4 in which the proximal end 41E and the distal end 42E of the holder 4 are connected to each other.

The operating member 7 has a screw portion 71 formed into a cylindrical shape and a pressing surface 72 connected to the screw portion 71. A male screw is formed on the outer peripheral surface of the screw portion 71 and threadedly engaged with the female screw of a through-hole 47 formed on the holder 4. In an example shown in FIG. 2, the through-hole 47 is formed to be exposed to the side of the distal end surface 425 through the distal end surface 425 of the holder 4, and an axial line X of the male screw of the operating member 7 and the through-hole 47 of the holder 4 is formed to be parallel to the longitudinal direction DL of the holder 4.

The cutting insert 2 has a first end surface 21, the second end surface 22 on the side opposite to the side of the first end surface 21, the peripheral lateral surface 23 that connects the first end surface 21 and the second end surface 22 to each other, and an mounting hole 29 that penetrates the first end surface 21 and the second end surface 22. The peripheral lateral surface 23 includes cutting blades 24 that cut off an object to be cut and rake faces 25 and flanks 26 that face the cutting blades 24.

At least a part of the second end surface 22 is configured as a bottom surface supported by the seating surface 52 of the insert mounting seat 5. In the example shown in FIG. 2, the first end surface 21 and the second end surface 22 have substantially the same shape. Therefore, it is possible to attach the cutting insert 2 to the insert mounting seat 5 with the first end surface 21 serving as a bottom surface by inverting the cutting insert 2 upside down.

In the example shown in FIG. 2, the peripheral lateral surface 23 is formed symmetrically at 180° with respect to a central axis Z of the mounting hole 29. The peripheral lateral surface 23 includes the totally four cutting blades 24 of two blades 24 usable when the cutting insert 2 is attached to the insert mounting seat 5 with the second end surface 22 serving as a bottom surface and two cutting blades 24 usable when the cutting insert 2 is attached to the insert mounting seat 5 with the first end surface 21 serving as a bottom surface.

Figure 3:
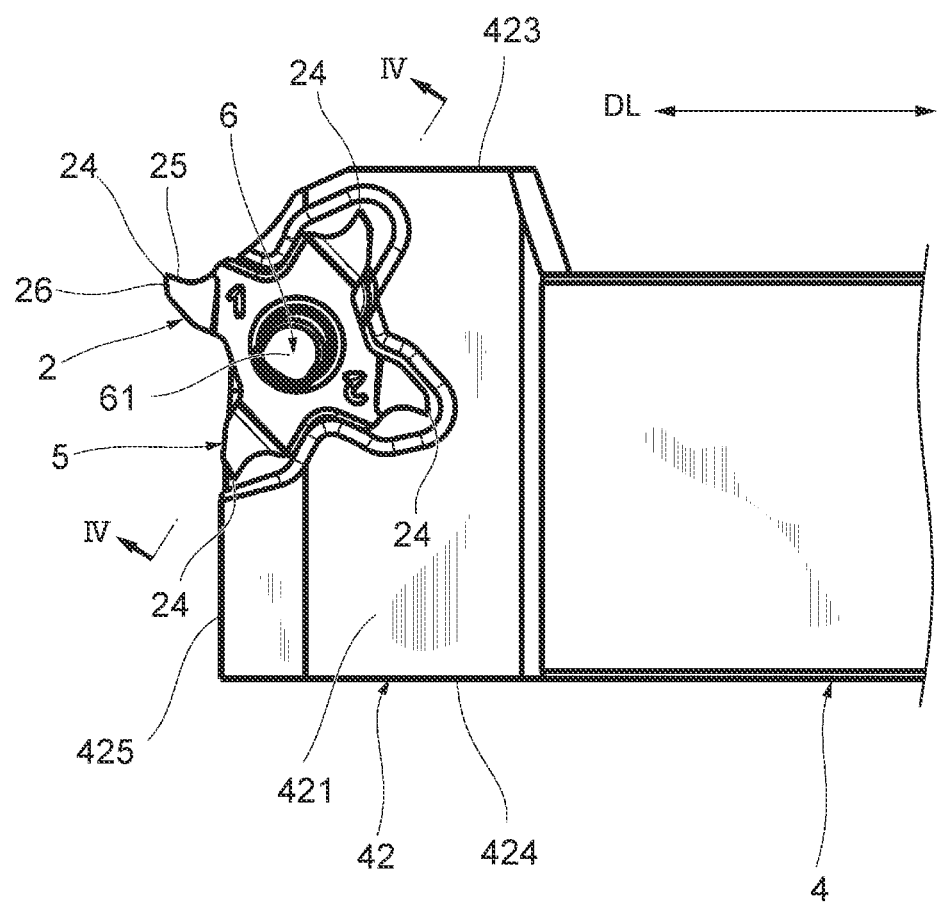
FIG. 3 is a perspective view of a distal end shown in FIG. 1 when seen from the side of a first surface.

FIG. 3 is a plan view of the distal end 42 shown in FIG. 1 when seen from the side of the first surface 421. The clamp member 6 turns along a IV-IV line on the symmetrical surface of the clamp member 6 and constrains the cutting insert 2 placed on the insert mounting seat 5. As shown in FIG. 3, a direction in which the axial line X of the screw portion 71 extends is greatly deviated from the symmetrical surface of the clamp member 6 including the IV-IV line.

Figure 4:
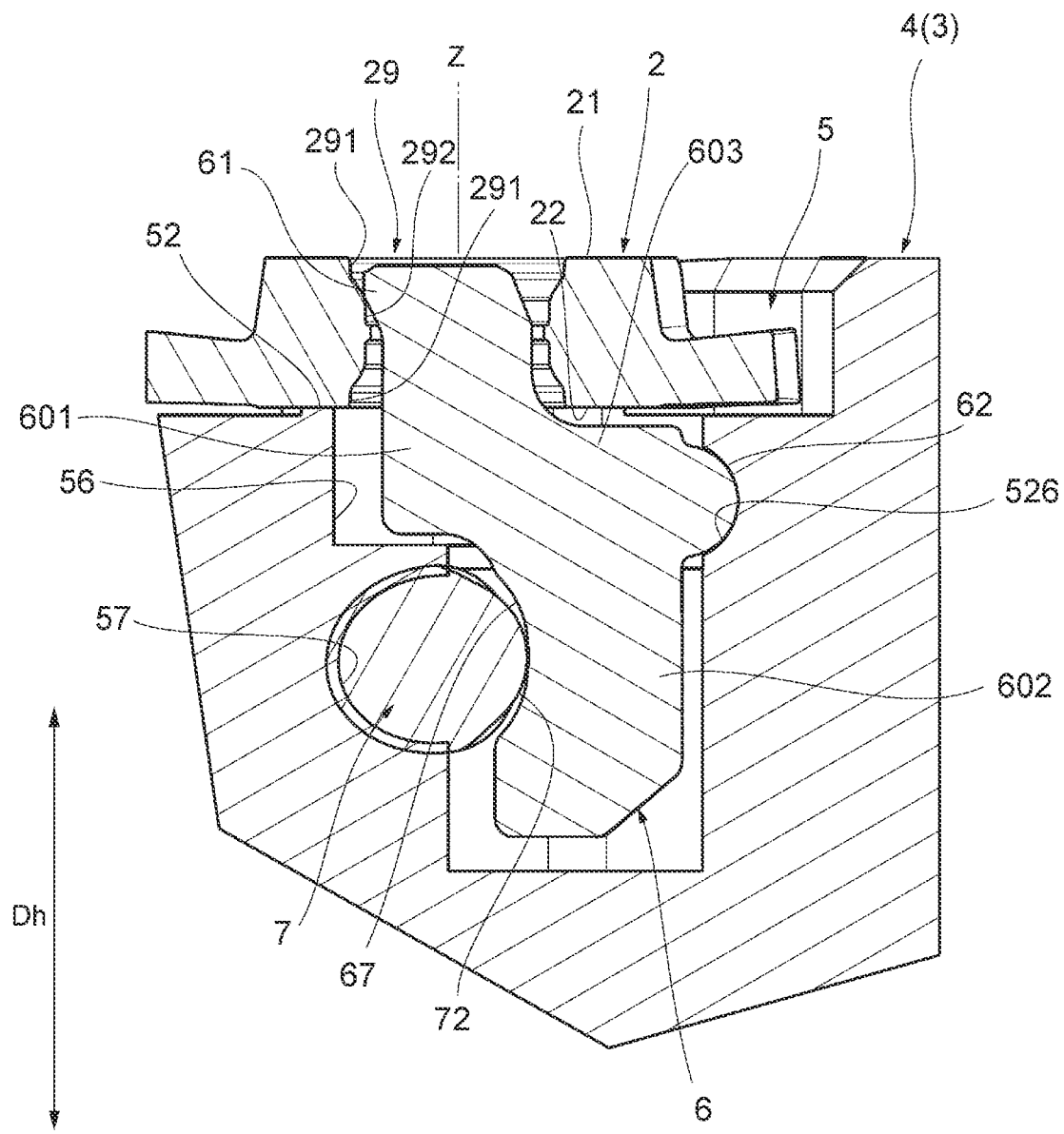
FIG. 4 is a cross-sectional view along a IV-IV line in FIG. 3.

FIG. 4 is a cross-sectional view along the IV-IV line in FIG. 3 and shows the symmetrical surface of the clamp member 6. As shown in FIG. 4, the inner peripheral surface of an mounting hole 29 for the cutting insert 2 has a large diameter portion 291 and a diameter reducing portion 292 having an inner diameter smaller than that of the large diameter portion 291. In an example shown in FIG. 4, the large diameter portion 291 is formed on each of the first end surface 21 and the second end surface 22, and the diameter reducing portion 292 is formed on the intermediate portion between the first end surface 21 and the second end surface 22.

The clamp member 6 has a spherical head portion 62, a pressure receiving surface 67, and a hook portion 61. The spherical head portion 62 is formed into a spherical crown shape (see FIG. 2). On the insert mounting seat 5, a recessed spherical surface 562 following the shape of the spherical head portion 62 is formed. Since the spherical head portion 62 slidingly contacts the recessed spherical surface 562, the insert mounting seat 5 supports the clamp member 6 to be swingable with the spherical head portion 62 as a fulcrum. As shown in FIG. 4, the hook portion 61 contacts the diameter reducing portion 292 of the cutting insert 2 in a state in which the pressure receiving surface 67 is pressed by the operating member 7.

Figure 5:
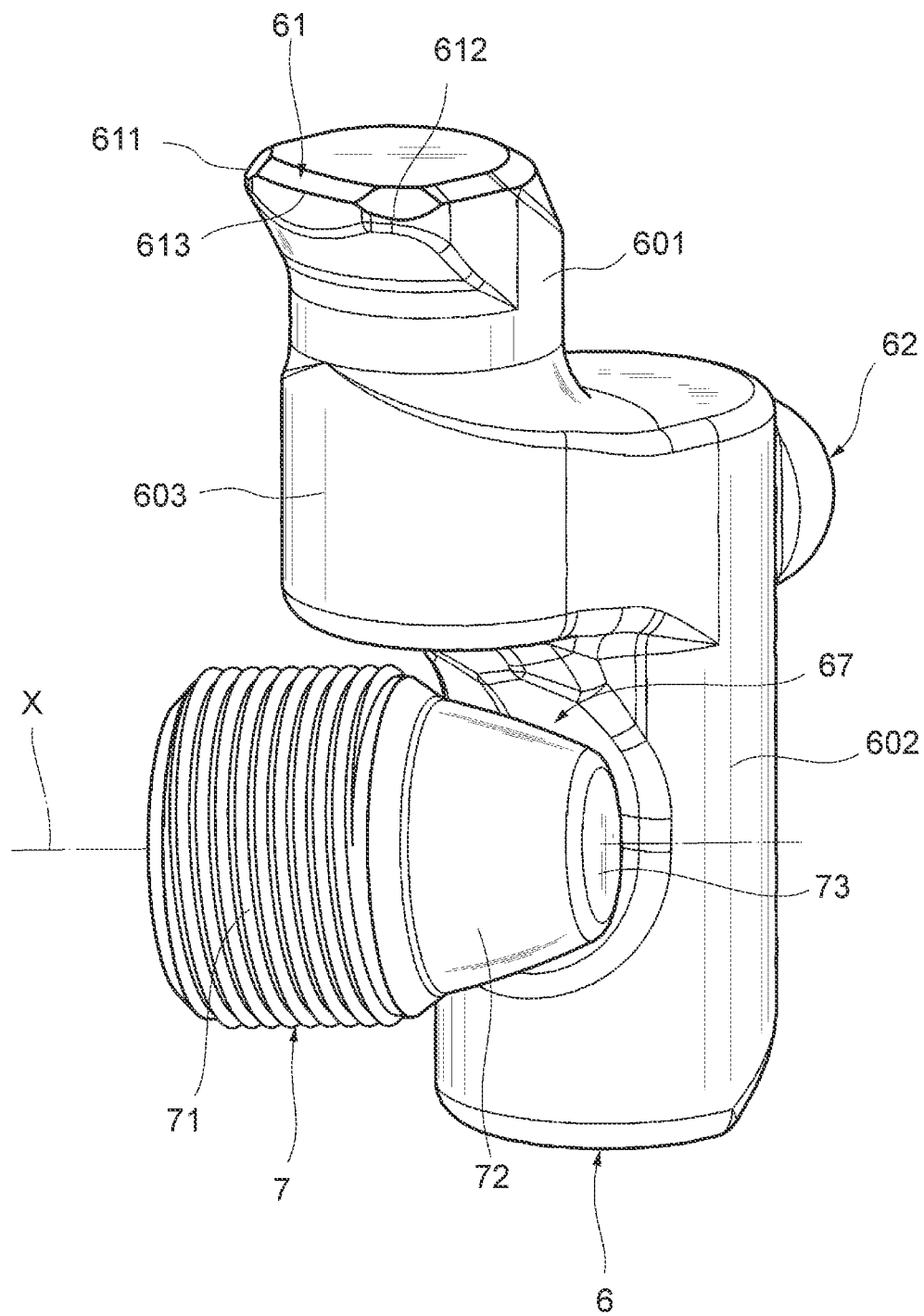
FIG. 5 is a perspective view showing a clamp member and an operating member that are shown in FIG. 4.

FIG. 5 is a perspective view showing the clamp member 6 and the operating member 7 that are shown in FIG. 4. The pressing surface 72 described above is capable of pressing the pressure receiving surface 67 in a direction crossing the axial line X of the screw portion 71. The operating member 7 may further have an apex surface 73 capable of pressing the pressure receiving surface 67 in a direction parallel to the axial line X. The apex surface 73 is arranged so as to cross the axial line X, and the pressing surface 72 is arranged so as not to cross the axial line X. The pressing surface 72 is formed so that its distance from the axial line X reduces as its distance from the screw portion 71 increases. In an example shown in FIG. 5, the pressing surface 72 is constituted by a track formed by rotating a protruding arc serving as a generating line about the axial line X on the outer peripheral side of the screw portion 71.

Figure 6:
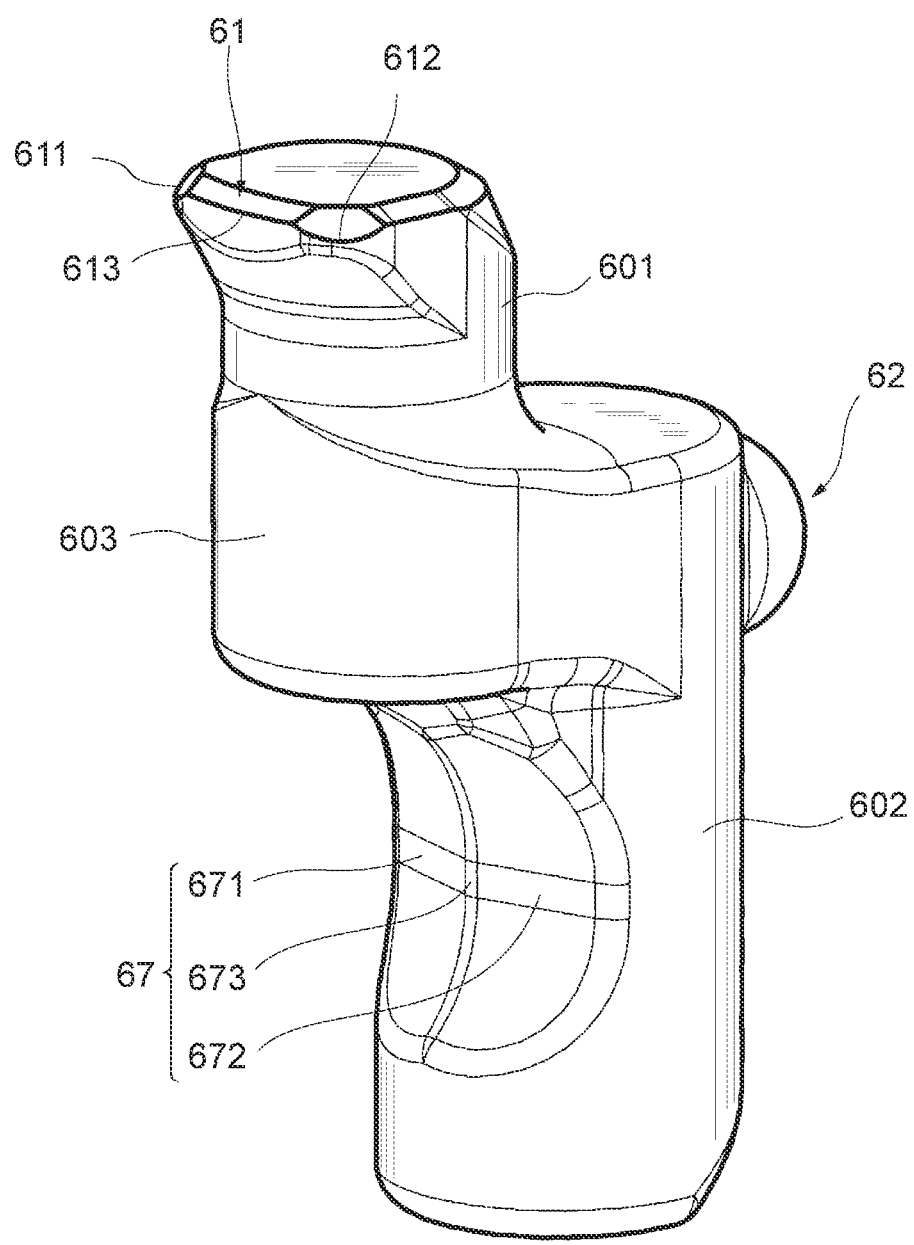
FIG. 6 is a perspective view showing a pressure receiving surface from which the operating member shown in FIG. 5 is removed.

FIG. 6 is a perspective view showing the pressure receiving surface 67 from which the operating member 7 shown in FIG. 5 is removed. In an example shown in FIG. 6, the pressure receiving surface 67 is constituted by a part of recessed cylindrical surfaces 671 and 672. The boundary between the recessed cylindrical surfaces 671 and 672 may be a ridge line. The pressure receiving surface 67 may further include a band-shaped curvature surface 673 that connects the gap between the recessed cylindrical surfaces 671 and 672.

Figure 7:
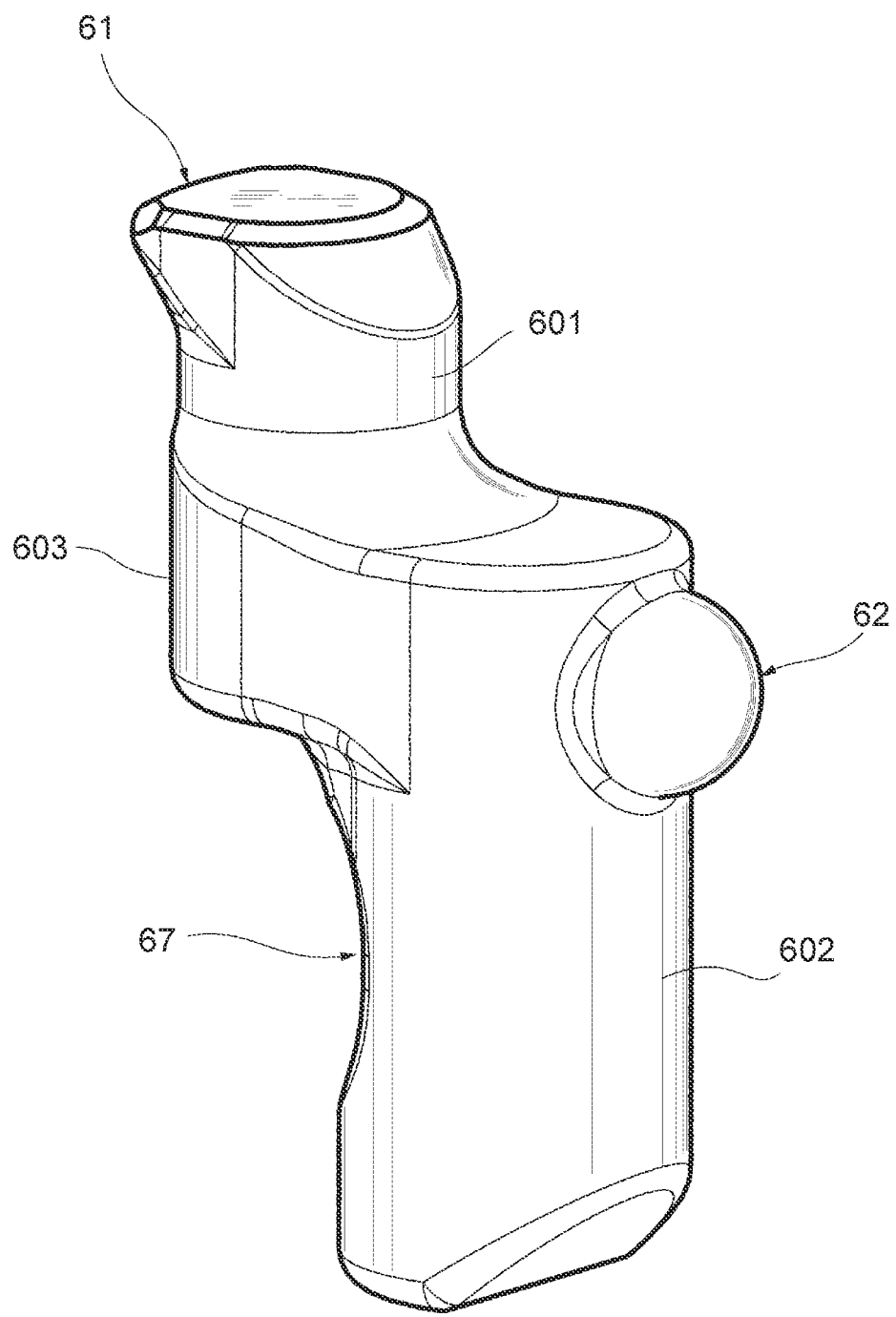
FIG. 7 is a perspective view of the clamp member shown in FIG. 5 when seen from the side of a spherical head portion.

FIG. 7 is a perspective view of the clamp member 6 shown in FIG. 5 when seen from the side of the spherical head portion 62. The spherical head portion 62 is formed into a spherical crown shape as described above and formed into a substantially semi-spherical shape in an example shown in FIG. 7. In the example shown in FIG. 7, the clamp member 6 is formed into a curved shape and includes first and second cylindrical portions 601 and 602 extending parallel to each other and a connecting portion 603 that connects the lower end of the first cylindrical portion 601 and the upper end of the second cylindrical portion 602 to each other.

The hook portion 61 is provided at the upper end of the first cylindrical portion 601. The pressure receiving surface 67 is provided between the upper end and the lower end of the second cylindrical portion 602. The spherical head portion 62 is provided at the upper end of the second cylindrical portion 602. At the upper end of the second cylindrical portion 602, the connecting portion 603 protrudes to the side opposite to the side of the spherical head portion 62.

Figure 8:
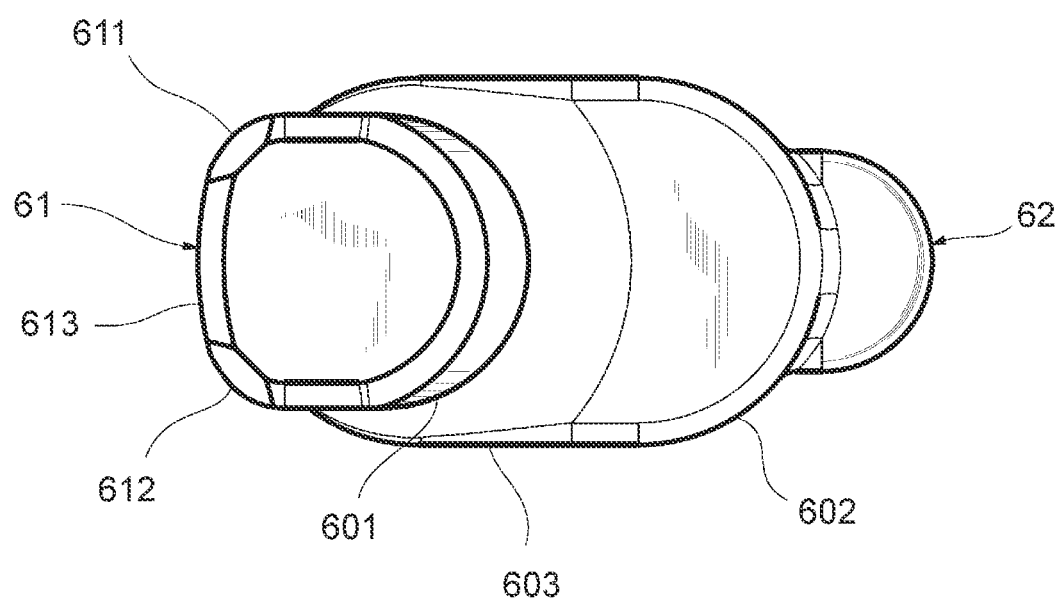
FIG. 8 is a plan view of the clamp member shown in FIG. 5 when seen from the side of the first surface.

FIG. 8 is a plan view of the clamp member 6 shown in FIG. 5 when seen from the side of the first surface 421 of the distal end 42 of the holder 4. As shown in FIG. 8, the hook portion 61 protrudes to the side opposite to the side of the spherical head portion 62 when seen from the side of the first surface 421, that is, when seen from above. The distal end of the hook portion 61 has a central portion 613 and first and second end portions 611 and 612 positioned on sides opposite to each other with the central portion 613 held therebetween.

The central portion 613 of the hook portion 61 does not contact the cutting insert 2, while the first and second end portions 611 and 612 of the hook portion 61 are formed to be angulated so that the first and second end portions (both end portions) 611 and 612 contact the diameter reducing portion 292 of the cutting insert. More specifically, the outer shape of the distal end of the hook portion 61 when seen from the side of the first surface 421 is formed so that the central portion 613 held between the first and second end portions 611 and 612 has an arc shape having a greater radius of the circle of curvature than that of the first cylindrical portion 601, and so that each of the first and second end portions 611 and 612 has an arc shape having a smaller radius of the curvature of circle than that of the first cylindrical portion 601.

A description will be given again with reference to FIG. 4. As shown in FIG. 4, a part (the upper half of the first cylindrical portion 601) of the clamp member 6 is positioned on a side closer to the first surface 421 than the bottom surface (the second end surface 22 in the example shown in FIG. 4) of the cutting insert 2 in a state in which the clamp member 6 constrains the cutting insert 2. The remaining parts (the lower half of the first cylindrical portion 601, the second cylindrical portion 602, and the connecting portion 603) of the clamp member 6 are positioned on a side closer to the second surface 422 than the bottom surface of the cutting insert 2.

The insert mounting seat 5 is provided with a pocket 56 that accommodates the remaining parts (buried parts) of the clamp member 6 that are buried on a side closer to the inner side (the side of the second surface 422) of the tool body 3 than the bottom surface of the cutting insert 2. The pocket 56 is formed into a substantially L-shape including a space extending parallel to the seating surface 52 and a space extending perpendicular to the seating surface. The recessed spherical surface 562 described above is provided at the corner portion of the substantially L-shaped pocket 56.

According to the tool body 3 of the present embodiment configured as described above, the clamp member 6 is capable of freely swinging vertically and horizontally with the spherical-crown-shaped spherical head portion 62 as a fulcrum. Since the spherical head portion 62 is supported by the recessed spherical surface 562 as shown in FIG. 4, the positional relationship between the clamp member 6 and the insert mounting seat 5 is not likely to change even if a sliding contact surface is rounded due to its abrasion.

As shown in FIG. 5, it is possible to make a direction in which the operating member 7 moves different from a direction in which the pressing surface 72 of the operating member 7 presses the pressure receiving surface 67 of the clamp member 6. Therefore, by a synergistic effect with the spherical-crown-shaped spherical head portion 62 having a large degree of freedom in movement, it is possible to reduce limitation on the arrangement of the operating member 7. As shown in FIG. 1, it is also possible to arrange the operating member 7 on the distal end surface 425. Therefore, a worker is allowed to easily replace the cutting insert 2 in a case in which the turning tool 1 is attached to a tool rest such as a turret.

The embodiment described above aims to facilitate the understanding of the present invention and does not intend to limit the interpretation of the present invention. The respective elements and their arrangements, materials, conditions, shapes, sizes, or the like provided in the embodiment are not limited to illustrated ones but are appropriately modifiable. Further, it is also possible to partially replace or combine configurations shown in different embodiments with each other.

What is claimed is:

1. A tool body to which a replaceable cutting insert is fixed, the tool body comprising:
   a holder:
   an insert mounting seat that is provided on a first surface of the holder;
   a clamp member that constrains the cutting insert placed on the insert mounting seat; and
   an operating member that presses a pressure receiving surface of the clamp member, wherein
   the clamp member has the pressure receiving surface, a spherical head portion that is formed into a spherical crown shape, and a hook portion that protrudes to a side opposite to a side of the spherical head portion when seen from a side of the first surface,
   the insert mounting seat supports the clamp member to be swingable with the spherical head portion as a fulcrum,
   the hook portion contacts a diameter reducing portion that is formed on an inner peripheral surface of a mounting hole for the cutting insert in a state in which the pressure receiving surface is pressed,
   the operating member has a screw portion on which a male screw threadedly engaged with the holder is formed and a pressing surface that presses the pressure receiving surface in a direction different than a direction at which an axial line of the screw portion extends,
   the pressure receiving surface is constituted by a part of a recessed cylindrical surface, and
   the pressing surface is constituted by a track formed by rotating a protruding arc serving as a generating line about the axial line of the screw portion on an outer peripheral side of the screw portion.

2. The tool body according to claim 1, wherein
   the holder has a distal end surface that faces a side opposite to a side on which the tool body is fixed to a working machine, and
   at least a part of the operating member is exposed to a side of the distal end surface.

3. The tool body according to claim 2, wherein
   the hook portion has a central portion and first and second end portions that are positioned on sides opposite to each other with the central portion held therebetween, and
   the first and second end portions contact the cutting insert while the central portion does not contact the cutting insert.

4. The tool body according to claim 1, wherein
   the hook portion has a central portion and first and second end portions that are positioned on sides opposite to each other with the central portion held therebetween, and
   the first and second end portions contact the cutting insert while the central portion does not contact the cutting insert.

5. A tool body to which a replaceable cutting insert is fixed, the tool body comprising:
   a holder:
   an insert mounting seat that is provided on a first surface of the holder;
   a clamp member that constrains the cutting insert placed on the insert mounting seat; and
   an operating member that presses a pressure receiving surface of the clamp member, wherein
   the clamp member has the pressure receiving surface, a spherical head portion that is formed into a spherical crown shape, and a hook portion that protrudes to a side opposite to a side of the spherical head portion when seen from a side of the first surface,
   the insert mounting seat supports the clamp member to be swingable with the spherical head portion as a fulcrum,
   the hook portion contacts a diameter reducing portion that is formed on an inner peripheral surface of a mounting hole for the cutting insert in a state in which the pressure receiving surface is pressed,
   the holder has a distal end surface that faces a side opposite to a side on which the tool body is fixed to a working machine, and
   at least a part of the operating member is exposed to a side of the distal end surface.

6. The tool body according to claim 5, wherein
   the hook portion has a central portion and first and second end portions that are positioned on sides opposite to each other with the central portion held therebetween, and
   the first and second end portions contact the cutting insert while the central portion does not contact the cutting insert.

* * * * *